(12) United States Patent
Buettner et al.

(10) Patent No.: US 10,996,322 B2
(45) Date of Patent: May 4, 2021

(54) LIDAR SENSOR

(71) Applicant: Robert Bosch GmbH, Stuttgart (DE)

(72) Inventors: Axel Buettner, Stuttgart (DE);
Hans-Jochen Schwarz, Stuttgart (DE);
Klaus Stoppel, Mundelsheim (DE);
Reiner Schnitzer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 462 days.

(21) Appl. No.: 15/760,160

(22) PCT Filed: Jul. 26, 2016

(86) PCT No.: PCT/EP2016/067734
§ 371 (c)(1),
(2) Date: Mar. 14, 2018

(87) PCT Pub. No.: WO2017/045816
PCT Pub. Date: Mar. 23, 2017

(65) Prior Publication Data
US 2018/0267148 A1 Sep. 20, 2018

(30) Foreign Application Priority Data
Sep. 18, 2015 (DE) .......................... 102015217908.7

(51) Int. Cl.
*G01S 7/481* (2006.01)
*G01S 17/42* (2006.01)
(Continued)

(52) U.S. Cl.
CPC ........... *G01S 7/4817* (2013.01); *G01S 7/4811* (2013.01); *G01S 7/4812* (2013.01); *G01S 7/4814* (2013.01);
(Continued)

(58) Field of Classification Search
None
See application file for complete search history.

(56) References Cited

U.S. PATENT DOCUMENTS 9,285,477 B1 * 3/2016 Smith ...................... G01S 17/89
9,360,665 B2 * 6/2016 Azuma .............. G02B 26/0875
(Continued)

FOREIGN PATENT DOCUMENTS

DE 102011007243 A1 10/2012
EP 2110699 A2 10/2009
(Continued)

OTHER PUBLICATIONS

International Search Report dated Oct. 13, 2016, of the corresponding International Application PCT/EP2016/067734 filed Jul. 26, 2016.

*Primary Examiner* — Luke D Ratcliffe
*Assistant Examiner* — Amir J Askarian
(74) *Attorney, Agent, or Firm* — Norton Rose Fulbright US LLP; Gerard Messina (57) ABSTRACT

A lidar sensor, especially for motor vehicles, having a light source, a movable deflection mirror for producing a scanning beam that sweeps across a monitored space by deflecting a light beam emitted by the light source, and having an optical receiver for detecting light reflected by an object hit by the scanning beam in the monitored space. The light source and the deflection mirror are adapted for using the deflected light beam to scan an array of micro-optical elements, each of which, in response to being impinged upon by this light beam, widens it into a divergent beam; and, configured at a distance from the array of micro-optical elements, is a light-concentrating element that transforms
(Continued)

the divergent beam into a beam which forms the scanning beam and whose beam diameter is larger than that of the deflected beam.

26 Claims, 5 Drawing Sheets

(51) Int. Cl.
    *G02B 27/09*     (2006.01)
    *G01S 17/931*     (2020.01)
    *G02B 26/10*     (2006.01)

(52) U.S. Cl.
    CPC ............ *G01S 17/42* (2013.01); *G01S 17/931* (2020.01); *G02B 27/0944* (2013.01); *G02B 27/0961* (2013.01); *G02B 27/0977* (2013.01); *G02B 26/105* (2013.01)

(56) References Cited

U.S. PATENT DOCUMENTS

| | | | | |
|---|---|---|---|---|
| 10,025,082 | B2* | 7/2018 | Shroff | G02B 21/004 |
| 2004/0114250 | A1* | 6/2004 | Kato | G02B 3/0062 |
| | | | | 359/626 |
| 2005/0264867 | A1* | 12/2005 | Cho | G02B 26/0825 |
| | | | | 359/291 |
| 2007/0057211 | A1* | 3/2007 | Bahlnnan | G01N 21/6486 |
| | | | | 250/584 |
| 2007/0146869 | A1* | 6/2007 | Lauer | G02B 21/004 |
| | | | | 359/368 |
| 2007/0195294 | A1* | 8/2007 | Willey | H04N 9/3141 |
| | | | | 353/119 |
| 2008/0048936 | A1* | 2/2008 | Powell | G02B 27/104 |
| | | | | 345/55 |
| 2008/0094607 | A1 | 4/2008 | Bernard et al. | |
| 2012/0051383 | A1* | 3/2012 | Stern | H01S 5/423 |
| | | | | 372/50.21 |
| 2014/0071431 | A1* | 3/2014 | Last | G01S 17/89 |
| | | | | 356/4.03 |
| 2014/0192406 | A1* | 7/2014 | Bathe | G02B 21/0032 |
| | | | | 359/385 |
| 2015/0176977 | A1* | 6/2015 | Abele | G01S 17/08 |
| | | | | 356/614 |
| 2015/0234178 | A1* | 8/2015 | Azuma | G02B 26/105 |
| | | | | 359/201.2 |
| 2015/0355449 | A1* | 12/2015 | Orth | G02B 21/361 |
| | | | | 348/79 |
| 2017/0010473 | A1* | 1/2017 | Ide | G02B 30/40 |

FOREIGN PATENT DOCUMENTS

| | | |
|---|---|---|
| JP | H1096624 A | 4/1998 |
| JP | 2010505631 A | 2/2010 |
| JP | 2011191633 A | 9/2011 |
| JP | 2012237810 A | 12/2012 |
| JP | 2013125165 A | 6/2013 |
| JP | 2015114562 A | 6/2015 |
| JP | 2015532462 A | 11/2015 |
| JP | 2016040630 A | 3/2016 |

* cited by examiner

LIDAR SENSOR

FIELD

The present invention relates to a lidar sensor, especially for motor vehicles, having a light source, a movable deflection mirror for producing a scanning beam that sweeps across a monitored space by deflecting a light beam emitted by the light source, and having an optical receiver for detecting light reflected by an object hit by the scanning beam in the monitored space.

BACKGROUND INFORMATION

In driver assistance systems for motor vehicles, lidar sensors are used, inter alia, for sensing the traffic environment, for example, for locating vehicles driving ahead or other obstacles.

When working with conventional lidar sensors of the aforementioned type, the light beam produced by the light source, for example, a semiconductor laser, is slightly widened by an optical system, so that it has a beam diameter of 1-2 mm, for example. This beam is then deflected by the deflection mirror and directly forms the scanning beam for locating objects. The deflection mirror is moved oscillatingly in one or two dimension(s), so that the scanning beam sweeps across a specific angular range or—in the case of a two-dimensional movement of the deflection mirror—a specific solid angle range that defines the monitored space.

The small beam diameter makes it possible for a small-sized deflection mirror to be used whose moment of inertia is correspondingly small, so that the mirror mechanism is not overloaded even at high oscillation frequencies, allowing the monitored space to be scanned at a high frame rate.

It is disadvantageous, however, that relatively high absorption and scattering losses occur under dusty, rainy or snowy conditions because the beam diameter is relatively small in comparison to the scattering particles (for example, snowflakes). Thus, unfavorable conditions limit the range and sensitivity of the lidar sensor. Moreover, the maximum permissible intensity of the laser beam is also limited by eye safety requirements. This also results in range and sensitivity restrictions.

As alternatives, what are generally referred to as macro scanning devices are available, where the optical system widens the laser beam to a significantly greater degree. In such situations, a very small beam angle of the scanning beam can be achieved in the far field because the beam parameter product is maintained. However, a very large dimensioned deflection mirror is needed to deflect the beam. As a whole, therefore, the lidar sensor is mostly tilted azimuthally. However, in such situations, the dimensions and mass inertia of the sensor allow only relatively small beam angles relative to the monitored space and/or low sampling frequencies and thus low frame rates. When an elevation angular resolution is also needed, multi-beam systems are mostly used, where a plurality of scanning beams are emitted at different elevation angles.

SUMMARY

It is an object of the present invention to provide a lidar sensor that renders possible a high sampling frequency and/or a large beam angle relative to the monitored space in consideration of the required level of eye safety and low sensitivity to scattering particles.

This objective may be achieved in accordance with the present invention in that the light source and the deflection mirror are adapted for using the deflected light beam to scan an array of micro-optical elements, each one of which, in response to being impinged upon by this light beam, is widened into a divergent beam. Also, a light-concentrating element is configured at a distance from the array of micro-optical elements. It transforms the divergent beam into a beam which forms the scanning beam and whose beam diameter is larger than that of the deflected beam.

Together, the micro-optical elements and the light-concentrating element widen the beam in a manner similar to that of a macro scanning device, making it possible to ensure eye safety, even at elevated total power levels of the laser beam, since the beam diameter is larger than the pupil diameter of the human eye. Also, the sensitivity to scattering particles is just as low as that of macro scanning devices. However, since the beam that is incident to the deflection mirror has a substantially smaller diameter, a smaller-sized deflection mirror may be used that allows suitably high sampling frequencies. The beam that is deflected by the deflection mirror does not directly scan the monitored space, rather only the array of micro-optical elements. The direction in which the scanning beam is then emitted is a function of the position of that micro-optical element which is impinged upon relative to the optical axis of the light-concentrating element. Therefore, the beam angle relative to the monitored space may be appreciably larger than the angle through which the light beam is maximally deflected by the deflection mirror. This makes it possible for a monitored space to be scanned using a wide beam angle at a high frame rate.

Advantageous embodiments and refinements of the present invention are described herein.

The micro-optical elements may optionally be refractive elements (for example, diverging lenses) or reflecting elements (for example, convex or concave mirrors). Also, diffractive elements (for example, DOEs, diffractive optical elements) may be used.

The light-concentrating element may be an optical lens, in whose focal plane lies the array of micro-optical elements, so that the divergent beams are transformed by the lens into virtually parallel beams. Alternatively, a concave mirror would also be conceivable instead of a lens.

The light-concentrating element may simultaneously form the compound lens of the optical receiver, so that the arriving beam reflected by the object is coaxial with the emitted beam, eliminating the need for considering parallax errors in the analysis of the detected signal. For example, a beam splitter that deflects the received light onto a detector array may be provided in the optical path between the light source and the light-concentrating element, thus between the light source and the deflection mirror, between the deflection mirror and the array of micro-optical elements, or between the array of micro-optical elements and the light-concentrating element. In an embodiment, the array of micro-optical elements may also simultaneously function as a beam splitter.

To compensate for aberrations, a convex form may be advantageous for the array of micro-optical elements or for a mirror that deflects the light onto this array.

Exemplary embodiments of the present invention are described below with reference to the figures.

DETAILED DESCRIPTION OF EXAMPLE EMBODIMENTS

Figure 1:
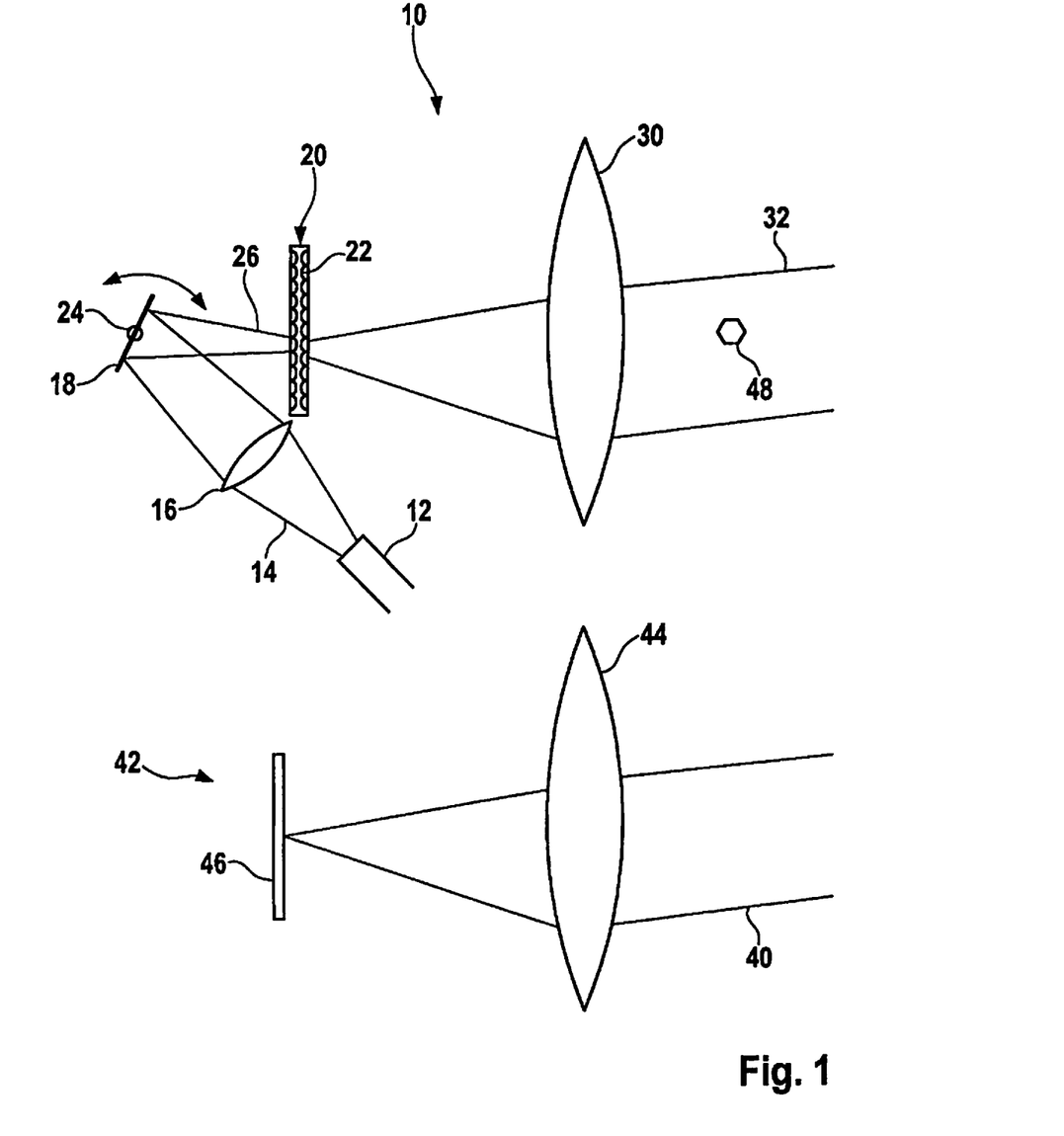
FIG. 1 shows a sketch of a lidar sensor according to the present invention.

Lidar sensor 10 shown in FIG. 1 features a semiconductor laser as a light source 12 that emits a light beam 14 in the visible region of the spectrum or, optionally, also in the infrared region. An imaging lens 16 focuses the light via a deflection mirror 18 onto an array 20 of micro-optical elements 22. In the illustrated example, array 20 is a transparent plate, for example, a glass plate, that has a fine grid of diverging lenses as micro-optical elements 22.

Deflection mirror 18 is pivotable about an axis 24 that extends orthogonally to the drawing plane in FIG. 1 and is moved oscillatingly, as indicated in FIG. 1 by a double-headed arrow. Light beam 14 is deflected by deflection mirror 18 to form a deflected beam 26 that scans array 20. That diverging lens, which is impinged upon by deflected beam 26, produces a divergent beam 28 that strikes a light-concentrating element in the form of a lens 30.

The distance between array 20 and lens 30 corresponds approximately to the focal length of lens 30, so that the lens transforms divergent beam 28 into a virtually parallel beam of rays that lidar sensor 10 emits as a scanning beam 32. The emission direction of scanning beam 32 is thereby a function of the location of that micro-optical element 22 which is impinged upon at that instant by deflected beam 26. In this way, deflection mirror 18 also indirectly effects a deflection of scanning beam 32.

Figure 2:
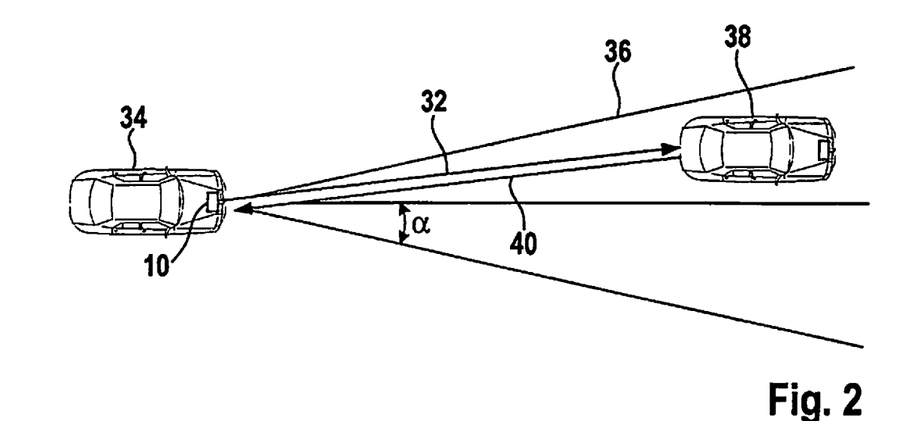
FIG. 2 shows an illustration of an exemplary application where the lidar sensor is used in a motor vehicle for locating an object.

FIG. 2 shows a motor vehicle 34 where lidar sensor 10 is mounted in the front end and is forward-facing in the direction of travel. With the aid of the deflection mirror, scanning beam 32 is oscillatingly deflected and sweeps across an angular range ±α, which, in the illustrated example, is ±12°, and defines a monitored space 36 scanned by lidar sensor 10. In the example shown, an object 38, namely a vehicle driving ahead that is located in monitored space 36, is struck by scanning beam 32 and reflects a portion of the radiation, so that a reflected beam 40 propagates back to lidar sensor 10 where it is received.

In the example shown in FIG. 1, a receiver 42 of the lidar sensor is made up of a lens 44 and an opto-electronic image sensor 46. Lens 44, which is configured next to lens 30, focuses reflected beam 40 onto image sensor 46. The image sensor is formed by a row or an array of CCD elements, for example.

In the configuration shown in FIG. 1, the distance between deflection mirror 18 and array 20 determines the angle through which the deflection mirror must be rotated to completely scan array 20. The greater this distance is, the smaller is the angular range within which deflection mirror 18 must be tilted. On the other hand, the angular range that is swept by scanning beam 32 and thus defines monitored space 36, is dependent on the focal length of lens 30 and thus on the distance between array 20 and lens 30 and may, therefore, be appreciably greater than twice the angular range within which deflection mirror 18 is tilted.

In the case of a one-dimensional lidar sensor, scanning beam 32 is only rotated in one dimension, for example, azimuthally, as shown in FIG. 2. In this case, array 20 of only one single row is composed of closely juxtaposed micro-optical elements 22.

On the other hand, in the case of a two-dimensional lidar sensor, where scanning beam 32 is also rotated in elevation, array 20 is a two-dimensional array that also extends orthogonally to the drawing plane in FIG. 1, and deflection mirror 18 is not only pivotable about axis 24, but also about an axis that extends at right angles to axis 24 in the longitudinal direction of the mirror.

In a practical example, light beam 14 produced by light source 12 has a diffraction index $M^2$ of approximately 3.3, a beam angle of approximately 1.7°, and a diameter of approximately 0.14 mm at the thinnest point. Imaging lens 16 has a diameter of 3 mm and a focal length of 29 mm; the distance to the light source is 76 mm. Deflection mirror 18 is approximately 11 mm distant from imaging lens 16 and approximately 40 mm from array 20 of the micro-optical elements. In the main scanning direction (vertically in FIG. 1), array 20 has a length of 22 mm and is constituted of ten micro-lenses per millimeter. Lens 30 has a diameter of 50 mm and a focal length of 50 mm. Scanning beam 32 may then be rotated over the mentioned angular range of +/−12° and has a diameter that is approximately 19 mm at the lens location and increases to approximately 57 cm over a distance of 180 m. Thus, the diameter of scanning beam 32, even directly at the lidar sensor, is twice as large as the entrance pupil of a human eye (approximately 7 mm), making it possible to maintain the necessary eye safety even at elevated total power levels of the laser radiation and a correspondingly large range and high sensitivity of the lidar sensor. Moreover, the beam diameter is larger than the typical diameter of scattering particles, such as snowflakes 48, raindrops, dust particles and the like, so that only correspondingly low scattering and absorption losses occur.

Figure 3:
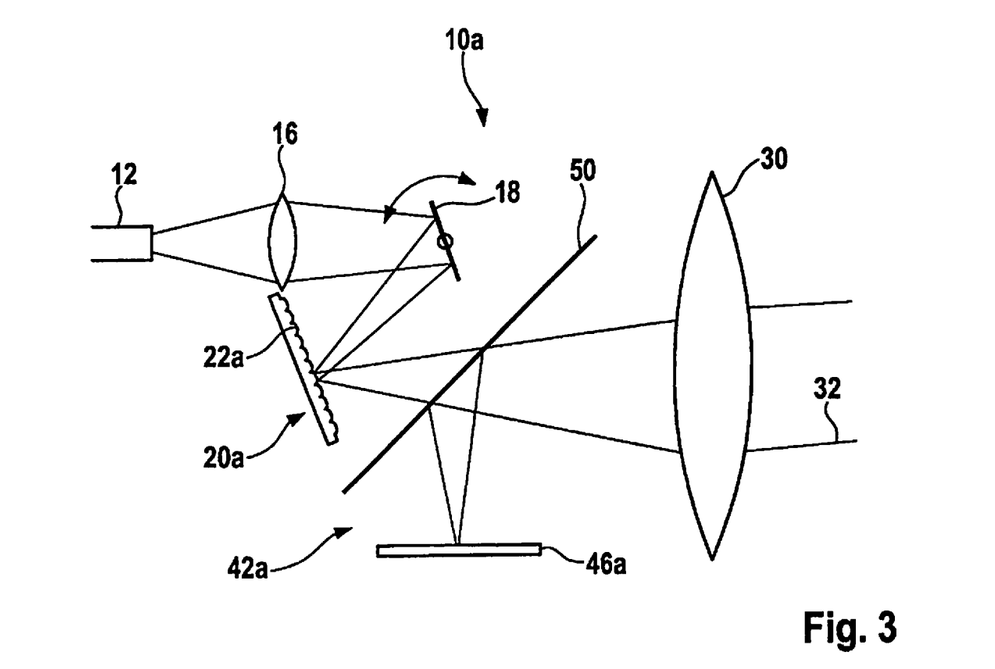
FIG. 3 through 8 show sketches of lidar sensors in accordance with further embodiments of the present invention.

As a further exemplary embodiment, FIG. 3 shows a lidar sensor 10a having an array 20a of micro-optical elements 22a formed by a reflecting plate. In this case, the individual micro-optical elements 22a are composed of small convex mirrors (or alternatively also of concave mirrors having a very short focal length).

In this exemplary embodiment, lens 30 simultaneously forms the compound lens of a receiver 42a, which, in turn, has a beam splitter 50, for example, a partially reflecting mirror, that transmits the divergent beam from micro-optical elements 22a to lens 30, but deflects a portion of the received light to an image sensor 46a. It is self-evident that this configuration of receiver 42a is also possible in embodiments that include refractive elements as micro-optical elements; conversely, a receiver that is configured separately from lens 30, is also possible in combination with reflecting micro-optical elements 22a.

Figure 4:
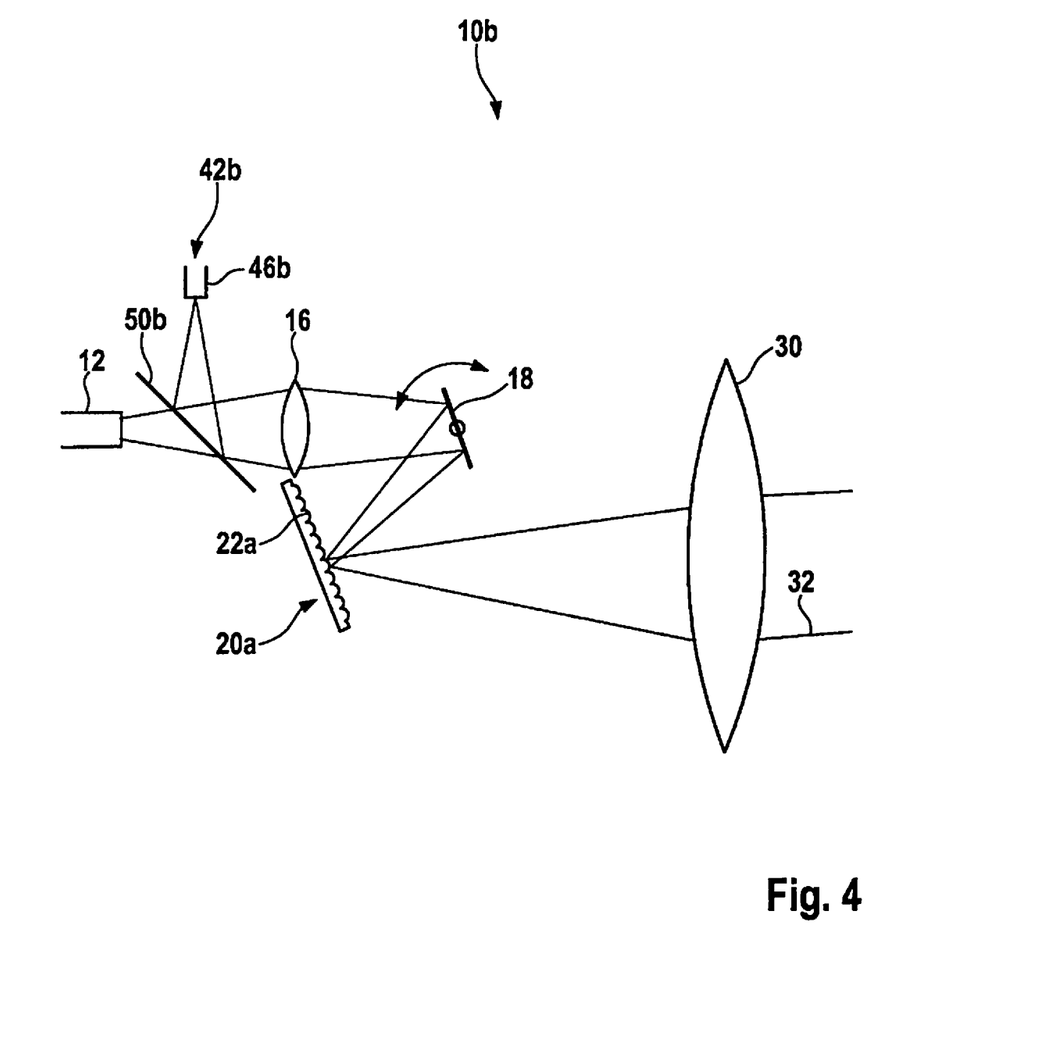

FIG. 4 shows a lidar sensor 10b, which differs from lidar sensor 10a, in that a differently designed receiver 42b is provided. This receiver has a beam splitter 50b in the form of a partially reflecting mirror that is configured between light source 12 and imaging lens 16 and deflects the received light onto image sensor 46b that is formed by one single light-sensitive element. Thus, in this specific embodiment, the received light is focused by lens 30 onto array 20a, reflected there onto deflection mirror 18, and, ultimately, focused by imaging lens 16 via beam splitter 50b onto image sensor 46b. The direction from which the light is received is derived in this case from the angular position of deflection mirror 18 that is known at all times, it being assumed that the signal propagation delay of the light is so short that the angle of rotation by which deflection mirror 18 is rotated within this period of time is negligibly small.

Figure 5:
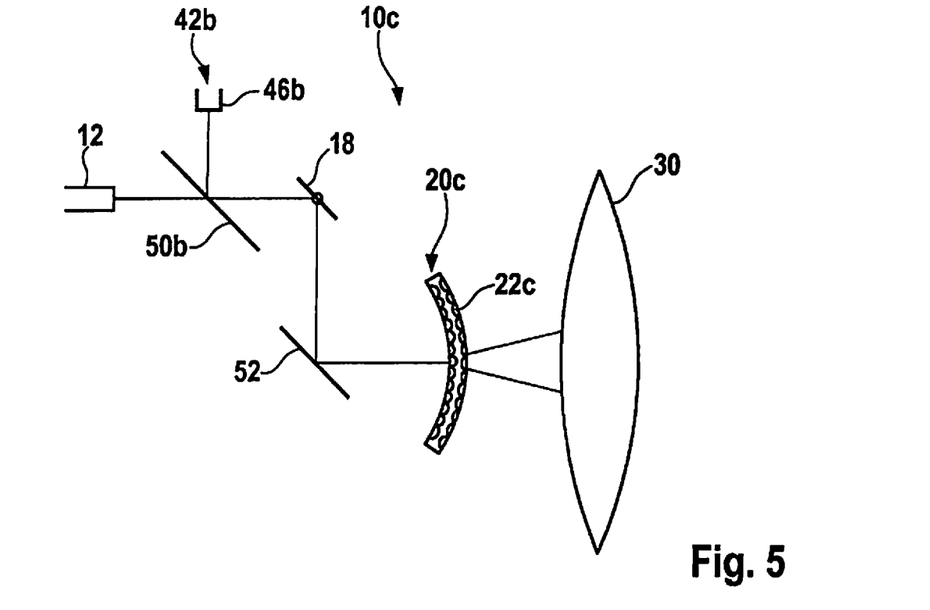

FIG. 5 shows a lidar sensor 10c that differs from the lidar sensor according to FIG. 4 in that a convex array 20c is provided as an array of micro-optical elements. The convexity of this array makes it possible to minimize aberrations. In this example, diffractive elements 22c are provided as micro-optical elements. Optionally, however, refractive or reflecting elements could also be provided.

Provided in this example between deflection mirror 18 and array 20c is another mirror 52 that deflects the light to impinge along the optical axis of lens 30 onto array 20c.

Figure 6:
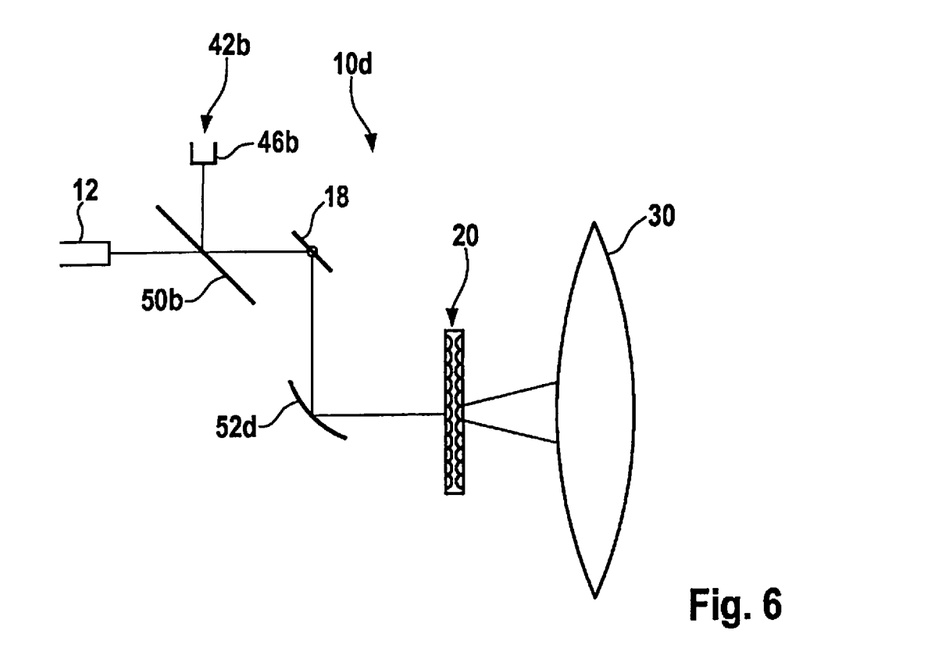

As a modified exemplary embodiment, FIG. 6 shows a lidar sensor 10d that features the same fundamental design as lidar sensor 10c in FIG. 5, with the distinction that curved array 20c of FIG. 5 is replaced by non-curved array 20 of micro-optical elements in accordance with FIG. 1. Instead, to compensate for aberrations, a curved mirror 52d is provided in place of flat mirror 52.

Figure 7:
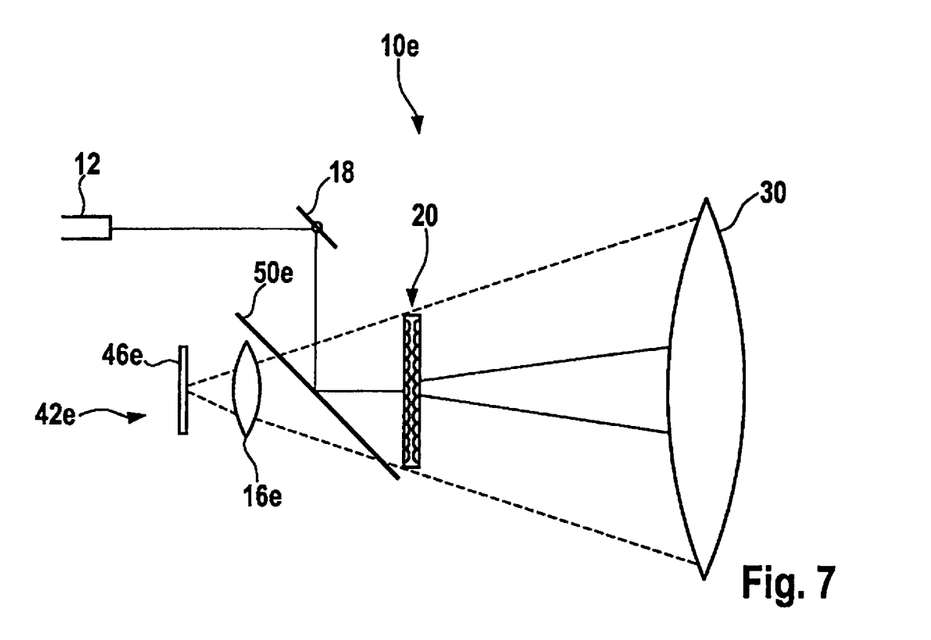

FIG. 7 shows a lidar sensor 10e where light source 12 produces a sharply concentrated parallel laser beam that is directed via a deflection mirror 18 and a partially reflecting mirror of a beam splitter 50e onto array 20 of micro-optical elements. The received light (shown here by broken lines) concentrated by lens 30 passes through (light-transmitting) array 20 onto beam splitter 50e and is coupled out by the same onto a receiver 42e that is made up of a planar (or linear) image sensor 46e and an imaging lens 16e. Additional imaging lens 16e makes it possible for a very small image sensor 46e to be used. Moreover, in this configuration, the receive aperture may be better utilized. Image sensor 46e receives all of the light of a beam of rays, which, at lens 30, fills the entire cross section thereof. A greater signal strength is thereby achieved in the receive path.

Figure 8:
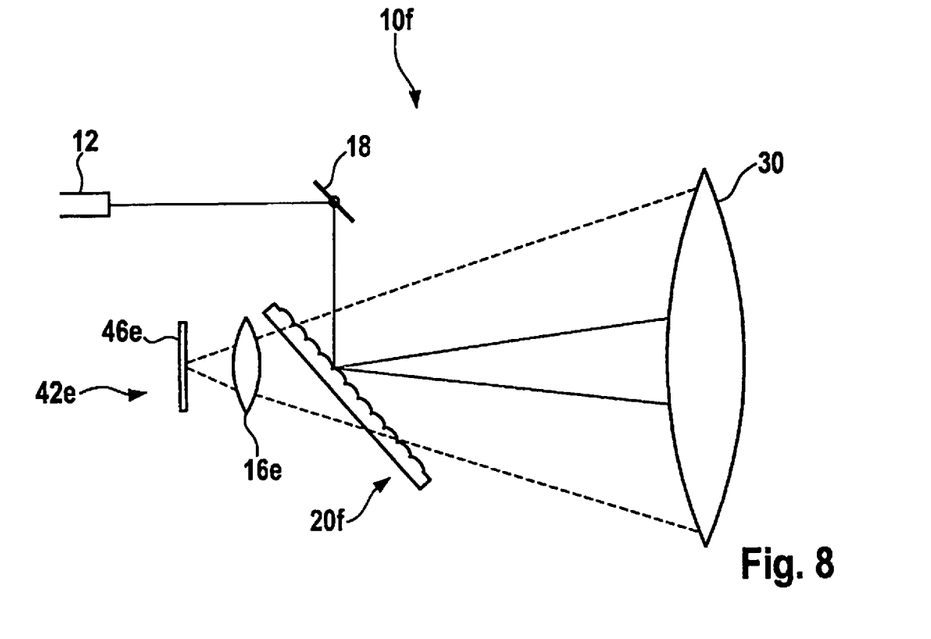

Finally, FIG. 8 shows a lidar sensor 10f that differs from lidar sensor 10e in that an array 20f of reflecting micro-optical elements is provided that is partially reflecting, however, and thus simultaneously functions as a beam splitter.

What is claimed is:

1. A lidar sensor, comprising:
   a light source;
   a movable deflection mirror;
   an array of micro-optical elements;
   a light-concentrating element; and
   an optical receiver;
   wherein:
   the lidar sensor is configured to produce a scanning beam that sweeps across a monitored space by the movable deflection mirror deflecting a light beam emitted by the light source;
   the optical receiver is configured to detect light reflected by an object hit by the scanning beam in the monitored space;
   the light source and the deflection mirror are adapted for the production of the scanning beam to be performed by using the deflected light beam to scan the array of micro-optical elements, each one of which, in response to being impinged upon by the deflected light beam, widens the deflected light beam into a divergent beam;
   the light-concentrating element is arranged at a distance from the array of micro-optical elements and is configured to transform the divergent beam into a beam of parallel rays that the lidar sensor outputs for impinging on the object, the parallel rays forming the scanning beam, whose beam diameter is larger than that of the deflected beam; and
   any one or more of the following features (A)-(E):
   (A) the lidar sensor further comprises an imaging lens arranged to focus the light beam emitted by the light source via the deflection mirror onto the array of micro-optical elements;
   (B) the emitted light beam and the deflected light beam have a maximum diameter of 5 mm, and the beam diameter of the scanning beam output by the light-concentrating element has a diameter of at least 14 mm;
   (C) the array of micro-optical elements is curved forming a convex surface facing the light-concentrating element;
   (D) the array of micro-optical elements is arranged between the movable deflection mirror and the light-concentrating element and is configured so that all of the deflected light beam from the movable deflection mirror passes completely through the array of micro-optical elements and is transformed by the array of micro-optical elements into the divergent beam that impinges upon the light-concentrating element; and
   (E) either:
   (1) the array of micro-optical elements is a beam splitter that is arranged between the movable deflection mirror and the light-concentrating element, is configured so that all of the deflected light beam from the movable deflection mirror is reflected by the array of micro-optical elements as the divergent beam that impinges upon the light-concentrating element, and is configured for the light reflected by the object that passes through the light-concentrating element to pass through the array of micro-optical elements towards the image sensor; or
   (2) the lidar sensor further comprises a beam splitter separate from the array of micro-optical elements, and: (a) the beam splitter is arranged between the light source and the deflection mirror; or (b) the beam splitter is arranged between the deflection mirror and the array of micro-optical elements; or (c) (I) with respect to a direction of emission of the light beam emitted by the light source, the deflection mirror is arranged downstream from the light source, and the array of micro-optical elements is arranged downstream from the deflection mirror, (II) the array of micro-optical elements is configured to reflect the deflected beam as the divergent beam towards the beam splitter, and (III) the beam splitter: (i) is arranged between the array of micro-optical elements and the light-concentrating element, (ii) is configured for the divergent beam from the array of micro-optical elements to pass through the beam splitter to the light-concentrating element, and (iii) is arranged to receive the light reflected by the object after having passed through the light-concentrating element and reflect the received light that has been reflected by the object to the optical receiver.

2. The lidar sensor as recited in claim 1, wherein the micro-optical elements are micro-lenses.

3. The lidar sensor as recited in claim 1, wherein the micro-optical elements are reflecting elements.

4. The lidar sensor as recited in claim 1, wherein the micro-optical elements are diffractive elements.

5. The lidar sensor as recited in claim 1, wherein the lidar sensor comprises the imaging lens arranged to focus the light beam emitted by the light source via the deflection mirror onto the array of micro-optical elements.

6. The lidar sensor as recited in claim 1, wherein the emitted light beam and the deflected light beam have the maximum diameter of 5 mm, and the beam diameter of the scanning beam output by the light-concentrating element has the diameter of at least 14 mm.

7. The lidar sensor as recited in claim 1, wherein the light-concentrating element simultaneously forms a compound lens of the receiver.

8. The lidar sensor as recited in claim 7, wherein the lidar sensor comprises the beam splitter, and the beam splitter is in a beam path between the light source and the light-concentrating element for deflecting the received light onto an image sensor of the receiver.

9. The lidar sensor as recited in claim 8, wherein the lidar sensor comprises the beam splitter that is separate from the array of micro-optical elements, and the beam splitter is arranged between the light source and the deflection mirror.

10. The lidar sensor as recited in claim 8, wherein the lidar sensor comprises the beam splitter that is separate from the array of micro-optical elements, and the beam splitter is arranged between the deflection mirror and the array of micro-optical elements.

11. The lidar sensor as recited in claim 1, wherein the receiver has a lens for focusing the received light, that is pre-focused by the light-concentrating element, onto an image sensor.

12. The lidar sensor as recited in claim 11, wherein the lens of the receiver and the light-concentrating element have a common optical axis and a beam splitter that is configured in such a way on the common optical axis that it deflects the light coming from the deflection mirror to the light-concentrating element, and couples out the received light into the receiver.

13. The lidar sensor as recited in claim 12, wherein the beam splitter is formed by the array of micro-optical elements.

14. The lidar sensor as recited in claim 1, wherein the array of micro-optical elements is curved forming the convex surface facing the light-concentrating element.

15. The lidar sensor as recited in claim 1, wherein another mirror is configured on an optical axis of the light-concentrating element that redirects the beam deflected by the deflection mirror onto the array of micro-optical elements.

16. The lidar sensor as recited in claim 15, where the mirror is curved.

17. The lidar sensor as recited in claim 1, wherein the array of micro-optical elements is arranged between the movable deflection mirror and the light-concentrating element and is configured so that all of the deflected light beam from the movable deflection mirror passes completely through the array of micro-optical elements and is transformed by the array of micro-optical elements into the divergent beam that impinges upon the light-concentrating element.

18. The lidar sensor as recited in claim 17, further comprising a lens, separate from the light-concentrating element arranged for the reflected light to pass through the lens and then impinge upon the optical receiver, without the optical receiver receiving any light within a beam path that includes any of the light source, deflection mirror, array of micro-optical elements, and light-concentrating element.

19. The lidar sensor as recited in claim 1, wherein:
the lidar sensor comprises the beam splitter that is separate from the array of micro-optical elements;
with respect to the direction of emission of the light beam emitted by the light source, the deflection mirror is arranged downstream from the light source, and the array of micro-optical elements is arranged downstream from the deflection mirror;
the array of micro-optical elements is configured to reflect the deflected beam as the divergent beam towards the beam splitter; and
the beam splitter:
is arranged between the array of micro-optical elements and the light-concentrating element;
is configured for the divergent beam from the array of micro-optical elements to pass through the beam splitter to the light-concentrating element; and
is arranged to receive the light reflected by the object after having passed through the light-concentrating element and reflect the received light that has been reflected by the object to the optical receiver.

20. The lidar sensor as recited in claim 1, wherein:
the lidar sensor comprises the beam splitter;
the beam splitter is arranged between the light source and the deflection mirror;
with respect to a direction of emission of the light beam emitted by the light source, the array of micro-optical elements is arranged downstream from the deflection mirror, and the light-concentrating element is arranged downstream from the array of micro-optical elements;
the array of micro-optical elements is configured to reflect the deflected beam as the divergent beam to the light-concentrating element; and
the beam splitter, deflection mirror, array of micro-optical elements, and light-concentrating element are arranged for the light that has been reflected by the object to pass through the light-concentrating element to the array of micro-optical elements, then be reflected by the array of micro-optical elements to the deflection mirror, then be reflected by the deflection mirror to the beam splitter, and then be reflected by the beam splitter to the optical receiver.

21. The lidar sensor as recited in claim 1, wherein:
the lidar sensor comprises the beam splitter that is separate from the array of micro-optical elements and another mirror;
the beam splitter is arranged between the light source and the deflection mirror;
with respect to a direction of emission of the light beam emitted by the light source, the other mirror is arranged downstream from the deflection mirror, the array of micro-optical elements is arranged downstream from the other mirror, and the light-concentrating element is arranged downstream from the array of micro-optical elements;
the other mirror is configured to reflect the deflected beam to the array of micro-optical elements, which is configured to the reflect the deflected beam received from the other mirror as the divergent beam to the light-concentrating element; and
the beam splitter, deflection mirror, other mirror, array of micro-optical elements, and light-concentrating element are arranged for the light that has been reflected by the object to pass through the light-concentrating element to the array of micro-optical elements, then pass through the array of micro-optical elements to the other mirror, then be reflected by the other mirror to the deflection mirror, then be reflected by the deflection mirror to the beam splitter, and then be reflected by the beam splitter to the optical receiver.

22. The lidar sensor as recited in claim 21, wherein the array of micro-optical elements is curved forming a convex surface facing the light-concentrating element.

23. The lidar sensor as recited in claim 21, where the other mirror is curved forming a concave surface facing the array of micro-optical elements.

24. The lidar sensor as recited in claim 1, wherein:
the lidar sensor comprises the beam splitter that is separate from the array of micro-optical elements;
with respect to a direction of emission of the light beam emitted by the light source, the deflection mirror is arranged downstream from the light source, the beam splitter is arranged downstream from the deflection mirror, the array of micro-optical elements is arranged downstream from the beam splitter, and the light-concentrating element is arranged downstream from the array of micro-optical elements;
the beam splitter is configured to reflect the deflected light beam from the deflection mirror to the array of micro-optical elements, with the array of micro-optical elements being configured for the deflected light beam reflected by the beam splitter to pass through the array of micro-optical elements to form the divergent beam, which then passes through the light-concentrating element; and
the optical receiver, beam splitter, array of micro-optical elements, and light-concentrating element are arranged for the light that has been reflected by the object to pass through the light-concentrating element to the array of micro-optical elements, then be reflected by the array of micro-optical elements to the beam splitter, and then be reflected by the beam splitter to the optical receiver.

25. The lidar sensor as recited on claim 24, wherein light source is configured to emit the emitted light beam as a sharply concentrated parallel laser beam that enters only a small sub-area of the array of micro-optical elements by which the array of micro-optical elements is configured to transform the sharply concentrated parallel laser beam into the divergent beam, and the array of micro-optical elements is configured for the light reflected by the object and that passes through the light-concentrating element to impinge upon an entire surface of the array of micro-optical elements, then pass through the array of micro-optical elements to the beam splitter, and then pass through the beam splitter towards the image sensor.

26. The lidar sensor as recited in claim 1, wherein the array of micro-optical elements is the beam splitter that is arranged between the movable deflection mirror and the light-concentrating element, is configured so that all of the deflected light beam from the movable deflection mirror is reflected by the array of micro-optical elements as the divergent beam that impinges upon the light-concentrating element, and is configured for the light reflected by the object that passes through the light-concentrating element to pass through the array of micro-optical elements towards the image sensor.

* * * * *